(12) United States Patent
Abrahamson

(10) Patent No.: US 6,441,998 B1
(45) Date of Patent: Aug. 27, 2002

(54) COMPENSATING FOR VORTEX SHEDDING IN A DISK DRIVE FOR MODIFYING THE THICKNESS OF AN ACTUATOR ARM

(75) Inventor: Scott D. Abrahamson, Longmont, CO (US)

(73) Assignee: Western Digital Technologies, Inc., Lake Forest, CA (US)

( * ) Notice: Subject to any disclaimer, the term of this patent is extended or adjusted under 35 U.S.C. 154(b) by 318 days.

(21) Appl. No.: 09/585,127

(22) Filed: May 31, 2000

(51) Int. Cl.[7] ............................ G11B 21/21; G11B 5/58
(52) U.S. Cl. .................. 360/137; 360/244.9; 29/603.03
(58) Field of Search ............................. 360/137, 244.2, 360/243.8, 244.9, 245.2; 29/603.03; 324/210, 212

(56) References Cited

U.S. PATENT DOCUMENTS

| 4,723,186 A | * | 2/1988 | Nakajima et al. | ........ | 360/244.9 |
| 6,366,432 B1 | * | 4/2002 | Tadepalli et al. | ........ | 360/264.2 |

FOREIGN PATENT DOCUMENTS

| JP | 63-268172 | * | 11/1988 |
| JP | 5-174507 | * | 7/1993 |
| JP | 2000-137967 | * | 5/2000 |

* cited by examiner

Primary Examiner—David L. Ometz
(74) Attorney, Agent, or Firm—Milad G Shara Esq

(57) ABSTRACT

A method of designing an actuator arm of a head stack assembly for use in a disk drive is disclosed. The disk drive comprises a disk, the actuator arm for positioning a head over the disk while the disk is rotating at a selected spin-rate. The actuator arm having a leading edge and a trailing edge and a selected thickness, and the head stack assembly having a structural resonance frequency. The disk is rotated such that the disk generates air flow around the actuator arm while the disk is spinning at the selected spin-rate. The actuator arm positions the head over the disk while the disk is spinning at the selected spin-rate, wherein the air flow travels from the leading edge to the trailing edge of the actuator arm such that the air flow causes vortex shedding at a vortex shedding frequency resulting in an undesirable force being applied to the actuator arm when the vortex shedding frequency is aligned with the structural resonance frequency. A perturbing effect due to the undesirable force applied to the actuator arm is measured. The thickness of the actuator arm is then modified and the thickness data stored. The process is then reiterated for a plurality of different actuator arm thickness values. A manufacturing thickness is then selected for the actuator arm from the stored thickness data to compensate for the undesirable force that is applied to the actuator arm due to the vortex shedding.

18 Claims, 8 Drawing Sheets

COMPENSATING FOR VORTEX SHEDDING IN A DISK DRIVE FOR MODIFYING THE THICKNESS OF AN ACTUATOR ARM

BACKGROUND OF THE INVENTION

1. Field of the Invention

The present invention relates to disk drives for computer systems. More particularly, the present invention relates to compensating for vortex shedding in a disk drive by modifying the thickness of an actuator arm.

2. Description of the Prior Art

Vortex shedding is a phenomenon manifesting in disk drives due to the air flow caused by the disk(s) spinning. A prior art head disk assembly 2 is shown in FIG. 1 as comprising a plurality of disks 4 and associated heads 6 actuated over the disks 4 by actuator arms 8 rotated about a pivot 10 by a voice coil 11 and magnets (not shown) of a voice coil motor. The air flowing around the actuator arms 8 generates an undesirable vertical oscillation which hinders the ability to maintain the heads 6 over the centerline of a track (i.e., tracking) during read and write operations. Specifically, when the air leaves the trailing edge of the actuator arms 8, it rolls up into coherent vortex structures aligned with the axis of the actuator arms 8. The vortex structures form alternately at the top and bottom of the trailing edges at a particular frequency referred to herein as the "vortex shedding" frequency. The vortex shedding frequency (f) is related to the velocity (U) of the air flow around the actuator arms 8 and the thickness (D) of the actuator arms 8. The relationship between these three parameters has been well studied for simple flows, such as a circular cylinder aligned perpendicular to a uniform velocity flow. For such a flow, it was determined that fD/U is a constant for a wide range of f, D and U. This result can be found in a variety of textbooks on fluid mechanics.

By virtue of their rapid rotation, a low pressure region is also formed at the center of the vortex structures. The low pressure region, in conjunction with the alternate formation of the vortex structures at the vortex shedding frequency, results in an undesirable vertical oscillation of the actuator arms 8. When the frequency of the vertical oscillation aligns with a structural resonance of the head stack assembly, large amplitude motion results.

There is, therefore, a need to compensate for vortex shedding in a disk drive in order to attenuate the perturbing effect on the actuator arms, thereby improving tracking performance.

SUMMARY OF THE INVENTION

The present invention may be regarded as a method of designing an actuator arm of a head stack assembly for use in a disk drive comprising a disk, the actuator arm for positioning a head over the disk while the disk is rotating at a selected spin-rate. The actuator arm having a leading edge and a trailing edge and a selected thickness, and the head stack assembly having a structural resonance frequency. The disk is rotated such that the disk generates air flow around the actuator arm while the disk is spinning at the selected spin-rate. The actuator arm positions the head over the disk while the disk is spinning at the selected spin-rate, wherein the air flow travels from the leading edge to the trailing edge of the actuator arm such that the air flow causes vortex shedding at a vortex shedding frequency resulting in an undesirable force being applied to the actuator arm when the vortex shedding frequency is aligned with the structural resonance frequency. A perturbing effect due to the undesirable force applied to the actuator arm is measured. The thickness of the actuator arm is then modified and the thickness data stored. The process is then reiterated for a plurality of different actuator arm thickness values. A manufacturing thickness is then selected for the actuator arm from the stored thickness data to compensate for the undesirable force that is applied to the actuator arm due to the vortex shedding.

The present invention may also be regarded as a disk drive comprising a disk and a head disk assembly. The head disk assembly comprises an actuator arm for positioning a head over the disk while the disk is rotating at a selected spin-rate. The actuator arm having a leading edge and a trailing edge and a selected thickness, and the head stack assembly having a structural resonance frequency. The actuator arm is designed using an iterative design procedure. The disk is rotated such that the disk generates air flow around the actuator arm while the disk is spinning at the selected spin-rate. The actuator arm positions the head over the disk while the disk is spinning at the selected spin-rate, wherein the air flow travels from the leading edge to the trailing edge of the actuator arm such that the air flow causes vortex shedding at a vortex shedding frequency resulting in an undesirable force being applied to the actuator arm when the vortex shedding frequency is aligned with the structural resonance frequency. A perturbing effect due to the undesirable force applied to the actuator arm is measured. The thickness of the actuator arm is then modified and the thickness data stored. The processes is then reiterated for a plurality of different actuator arm thickness values. A manufacturing thickness is then selected for the actuator arm from the stored thickness data to compensate for the undesirable force that is applied to the actuator arm due to the vortex shedding.

DESCRIPTION OF THE PREFERRED EMBODIMENTS

Figure 1:
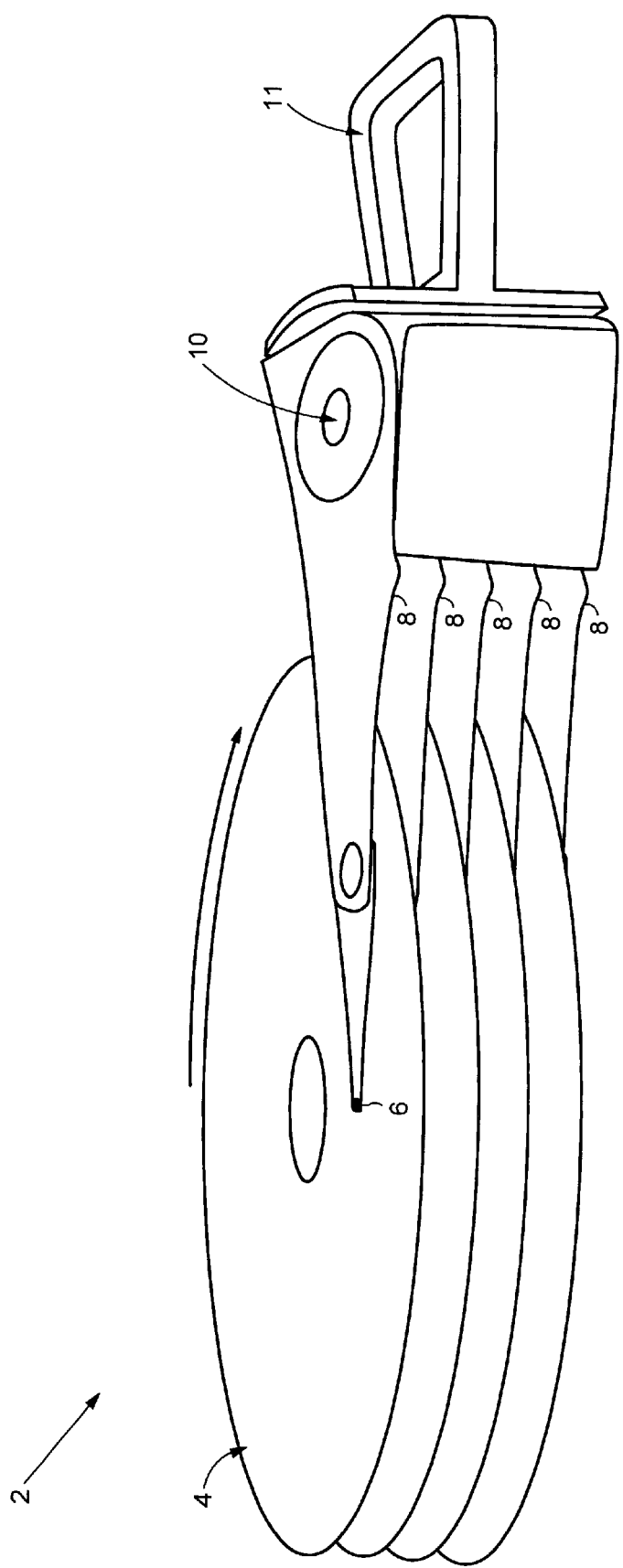
FIG. 1 shows a prior art head stack assembly comprising a plurality of disks and associated heads actuated over the disks by actuator arms rotated about a pivot by a voice coil motor.
Figure 2:
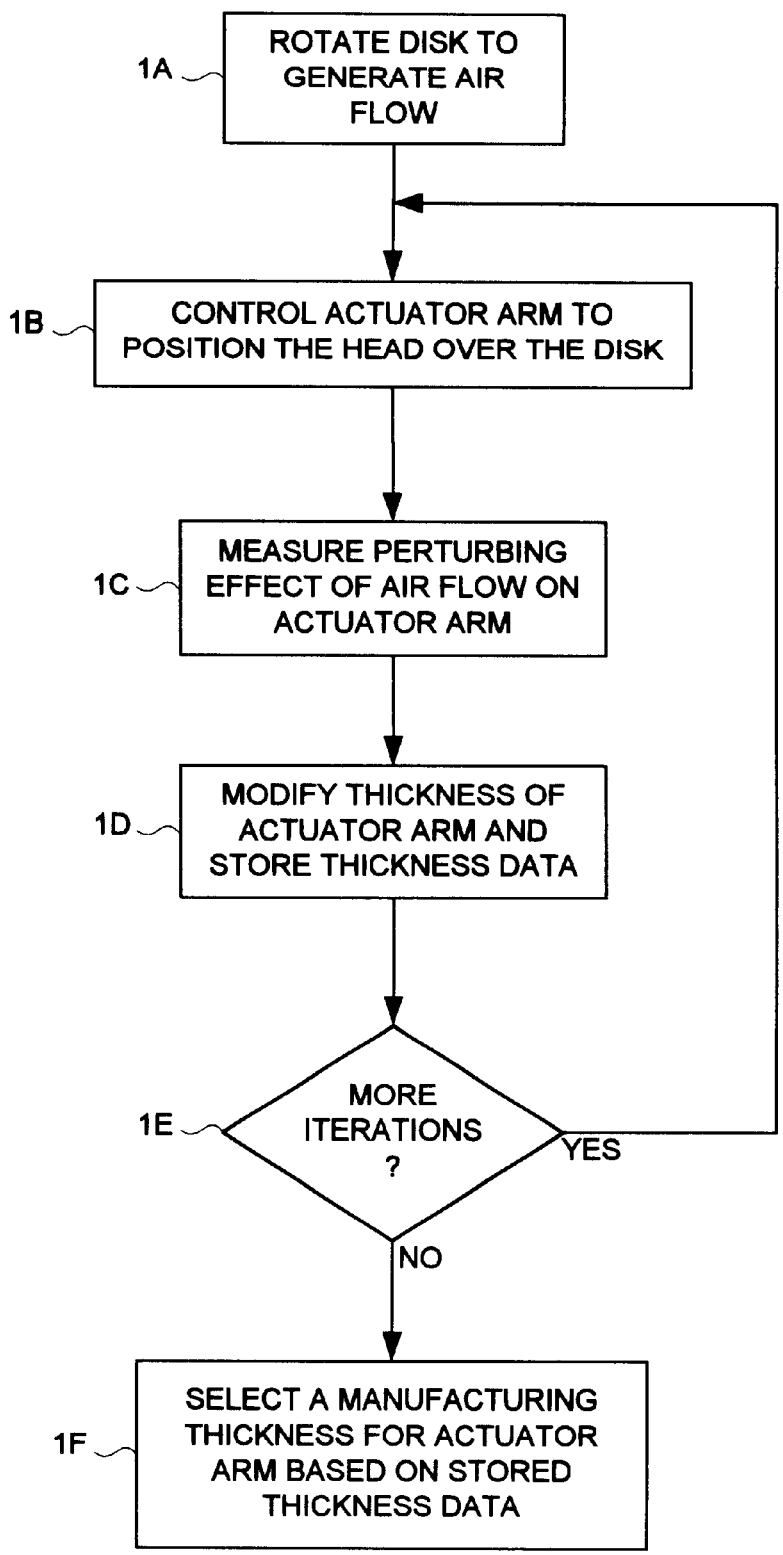
FIG. 2 is a flow diagram illustrating an iterative procedure according to an embodiment of the present invention for designing an actuator arm having a selected thickness which compensates for vortex shedding.
Figure 3:
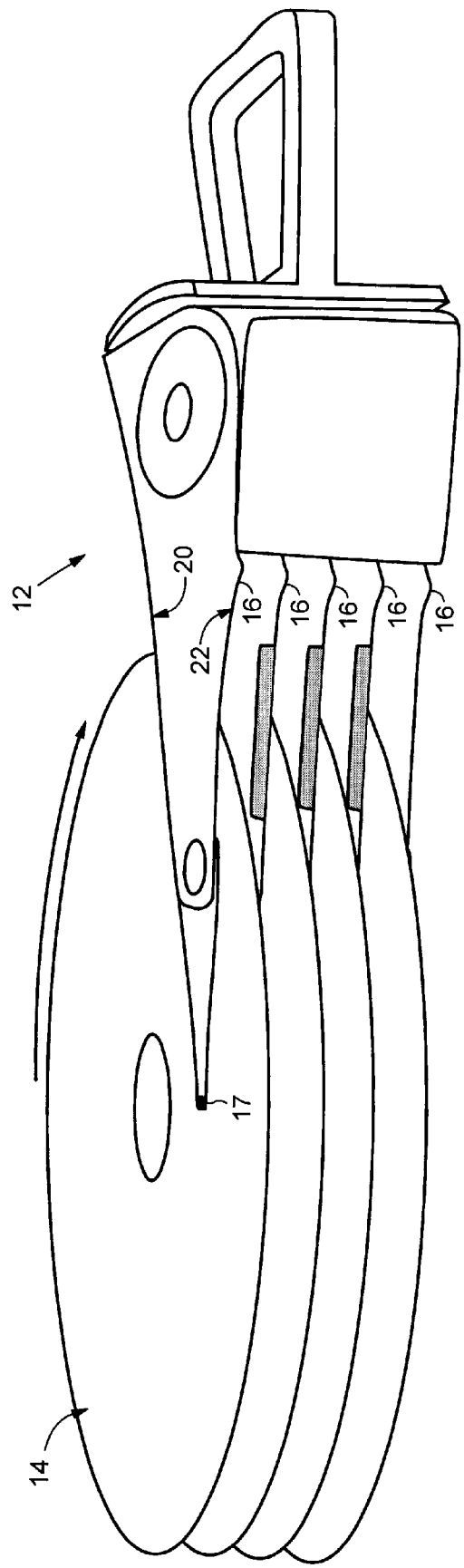
FIG. 3 shows a head stack assembly according to an embodiment of the present invention, wherein the thickness of the actuator arm has been modified in order to compensate for the undesirable force that is applied to the actuator arm due to the vortex shedding.

FIG. 2 shows a flow diagram illustrating an iterative procedure according to an embodiment of the present invention for designing an actuator arm 16 of a head stack assembly 12 (e.g., FIG. 3) for use in a disk drive comprising a disk 14, the head stack assembly 12 comprising an actuator arm 16 for positioning a head 17 over the disk 14 while the disk 14 is rotating at a selected spin-rate. The actuator arm 16 having a leading edge 20 and a trailing edge 22 and a selected thickness, and the head stack assembly 12 having a structural resonance frequency. At step 1A, the disk 14 is rotated such that the disk 14 generates air flow around the actuator arm while the disk is spinning at the selected spin-rate. At step 1B, the actuator arm 16 positions the head 17 over the disk 14 while the disk 14 is spinning at the selected spin-rate, wherein the air flow travels from the leading edge 20 to the trailing edge 22 of the actuator arm 16 such that the air flow causes vortex shedding at a vortex shedding frequency resulting in an undesirable force being applied to the actuator arm 16 when the vortex shedding frequency is aligned with the structural resonance frequency. At step 1C, a perturbing effect due to the undesirable force applied to the actuator arm 16 is measured, and at step 1D the thickness of the actuator arm 16 is modified and thickness data is stored. The process steps 1B–1D are then reiterated for a plurality of different actuator arm thickness values. Once a predetermined number of iterations have been performed at step 1E, at step 1F a manufacturing thickness is selected for the actuator arm 16 from the thickness data stored at step 1D to compensate for the undesirable force that is applied to the actuator arm 16 due to the vortex shedding.

Modifying the thickness of the actuator arm 16 does not eliminate the vortex shedding, it shifts the shedding frequency away from the resonance frequencies of the head stack assembly 12, thereby attenuating the vertical oscillation in the actuator arm 16.

Figure 4:
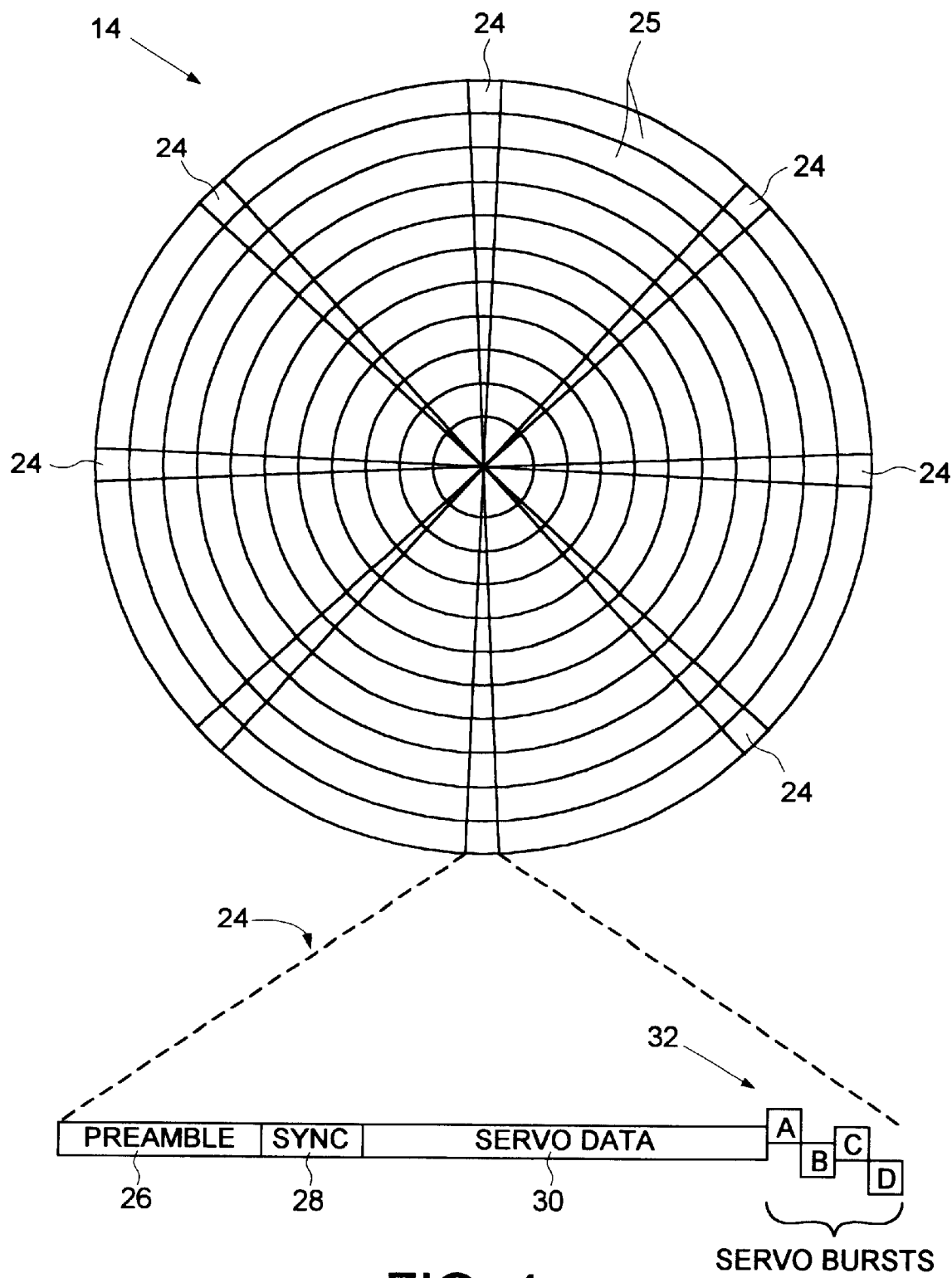
FIG. 4 shows the format of a disk storage medium comprising a plurality of data tracks and a plurality of embedded servo sectors, wherein the servo sectors each comprise a plurality of servo bursts for use in generating a head position error used to measure the perturbing effect of the vortex shedding.

In one embodiment of the present invention, at step 1C the perturbing effect that the vortex shedding has on the actuator arm 16 is measured from a position error signal generated by reading embedded servo sectors 24 recorded around the disk 14 at a predetermined interval as shown in FIG. 4. The servo sectors 24 are "embedded" between user data sectors recorded in concentric data tracks 25. Each servo sector 24 comprises a preamble field 26, a sync mark 28, servo data 30 (e.g., Gray coded servo address), and a plurality of servo bursts 32 recorded at precise intervals and offsets from a track centerline. Each servo burst 32 comprises media transitions recorded at a predetermined frequency. The position of the head 17 relative to the centerline of the track is typically derived by integrating the read signal as the head 17 passes over each servo burst and comparing the resulting burst area measurements. For example, if the head is off track, the burst area measured for the A servo burst may be greater than the burst area measured for the B servo burst. Thus, when the vortex shedding perturbs the actuator arm 16, it will be reflected in the position error signal generated when reading the servo bursts 32 in the embedded servo sectors 24.

Figure 5:
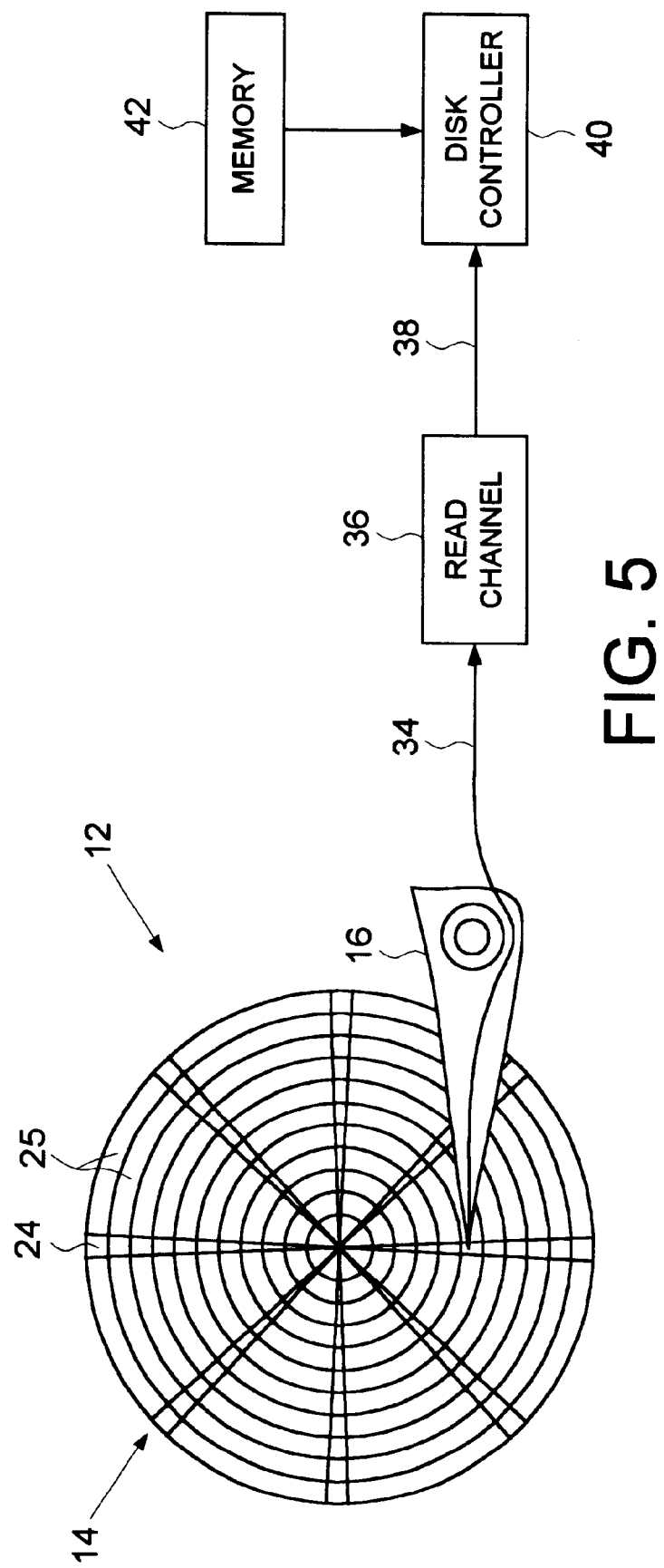
FIG. 5 illustrates a system used to select the manufacturing thickness of the actuator arm by iteratively modifying the thickness of the actuator arm and measuring the perturbing effect of the vortex shedding.

FIG. 5 illustrates a system for measuring the perturbing effect due to the vortex shedding by generating a position error signal from the servo bursts 32 recorded in the embedded servo sectors 24. In one embodiment, the system of FIG. 5 is implemented within a prototype disk drive since the measured perturbing effect of the air flow is influenced by the shrouding of the disk drive's enclosure. The head stack assembly 12 positions the head 17 over the disk 14 while the disk 14 is spinning at the selected spin-rate. Air flow travels from the leading edge 20 to the trailing edge 22 of the actuator arm 16, thereby causing vortex shedding at a vortex shedding frequency resulting in an undesirable force being applied to the actuator arm 16 when the vortex shedding frequency is aligned with a structural resonance frequency of the head stack assembly 12. The read head 17 senses transitions recorded on the disk 14, including the servo bursts 32 transitions, and generates a read signal 34. The read signal 34 is processed by a read channel circuit 36 which measures the area of each servo burst 32. The servo burst measurements are transferred over line 38 to a disk controller 40 which processes the servo burst measurements to generate the head position error. A memory 42 stores the steps of a program executed by the disk controller 40 as well as the resulting position error data to facilitate the iterative design procedure.

In an alternative embodiment of the present invention, a laser interferometer is employed to generate the position error for the head 17 rather than servo bursts in embedded servo sectors. A laser interferometer may provide a more accurate position error measurement, leading to a more accurate thickness design for the actuator arm 16.

The actuator arm 16 is constructed with an initial thickness before being installed in the prototype disk drive. A position error signal is then generated for several different tracks, that is, for several different radial locations of the head 17 since the velocity of the air flow (U), and thus the vortex shedding frequency, changes as the radial pitch of the actuator arm 16 changes. Typically, the vortex shedding force will create an undesirable perturbation over a narrow band of radial locations. When the actuator arm 16 reaches this narrow band, the signature of the vortex shedding reflected in the position error information will amplify. The position error information is stored in the memory 42 together with the associated thickness value. The thickness of the actuator arm 16 is then modified and again a position error is measured for several different tracks. The resulting position error data and associated thickness are stored in the memory 42. After performing this iterative procedure for several different thickness values, a manufacturing thickness is selected for the actuator arm 16 which compensates for the undesirable force that is applied to the actuator arm 16 due to the vortex shedding. For example, the thickness value which results in a minimum average position error signal may be selected as the manufacturing thickness.

In one embodiment, the thickness of the entire actuator arm 16 is modified to shift the vortex shedding frequency away from the resonance frequencies of the head stack assembly 12. However, this may increase power consumption, as well as modify the structural resonances of the head stack assembly 12 potentially resulting in positioning problems at other frequencies. In an alternative embodiment, the thickness of the actuator arm 16 is modified near the trailing edge 22, the region which controls the vortex shedding. Alternatively, the thickness of the actuator arm 16 may be modified near the leading edge 20 which can also provide the desired effect of shifting the vortex shedding frequency away from the structural resonance frequencies. Additionally, only a portion of the arm length may be modified to minimize power consumption associated with arm drag.

Figure 6:
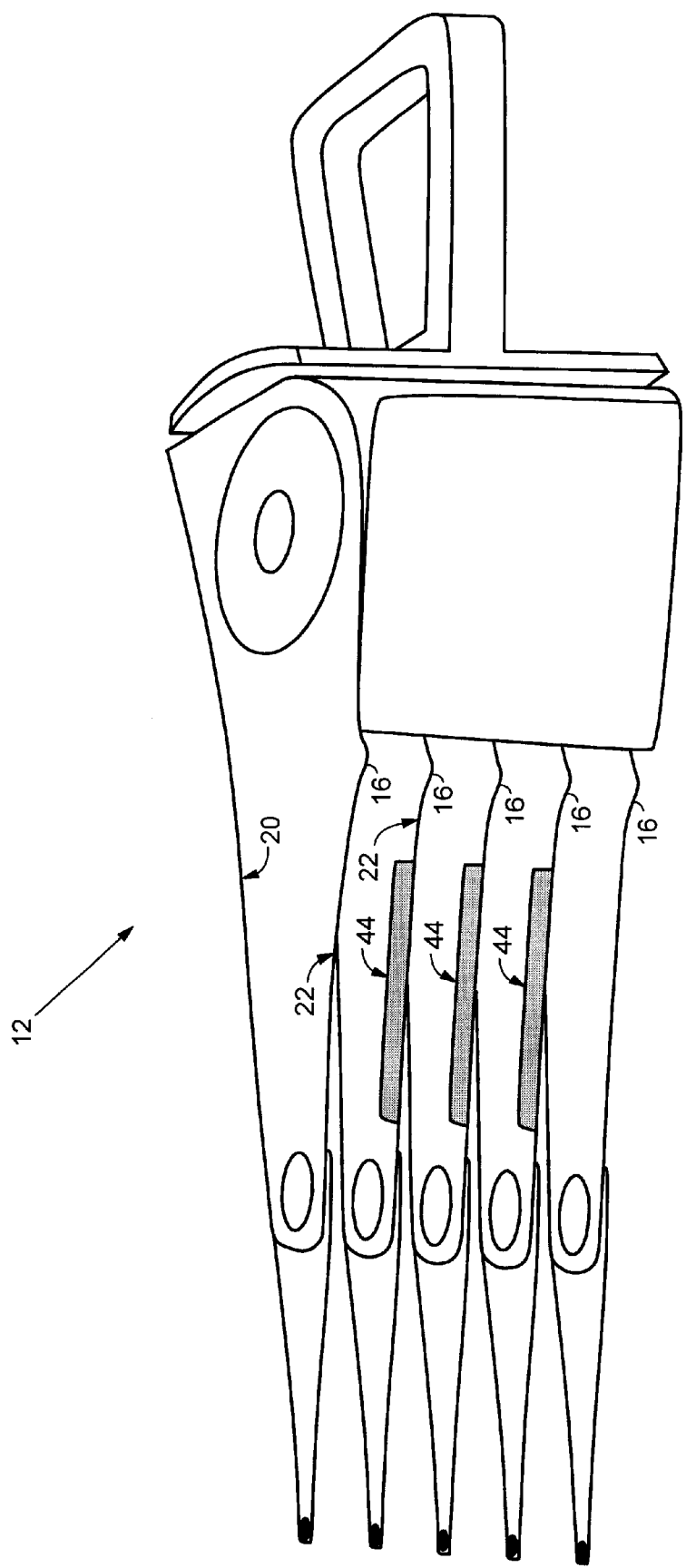
FIG. 6 shows further details of the actuator arm shown in FIG. 3.

Any suitable technique may be employed to modify the thickness of the actuator arm 16, including the addition of a shim to either one or both sides (top and/or bottom). This embodiment is illustrated in FIG. 6 which shows further details of the actuator arm 16 of FIG. 3 wherein a shim 44 has been added along at least part of the trailing edge 22. The shim 44 increases the thickness of the actuator arm 16 near the trailing edge 22 which decreases the vortex shedding frequency in order to shift it away from the resonance frequencies of the head stack assembly 12. The shim is preferably manufactured from a light-weight material, such as plastic, which does not significantly affect the balance or inertia of the actuator arm 16, or the resonance frequencies of the head stack assembly 12.

Figure 7:
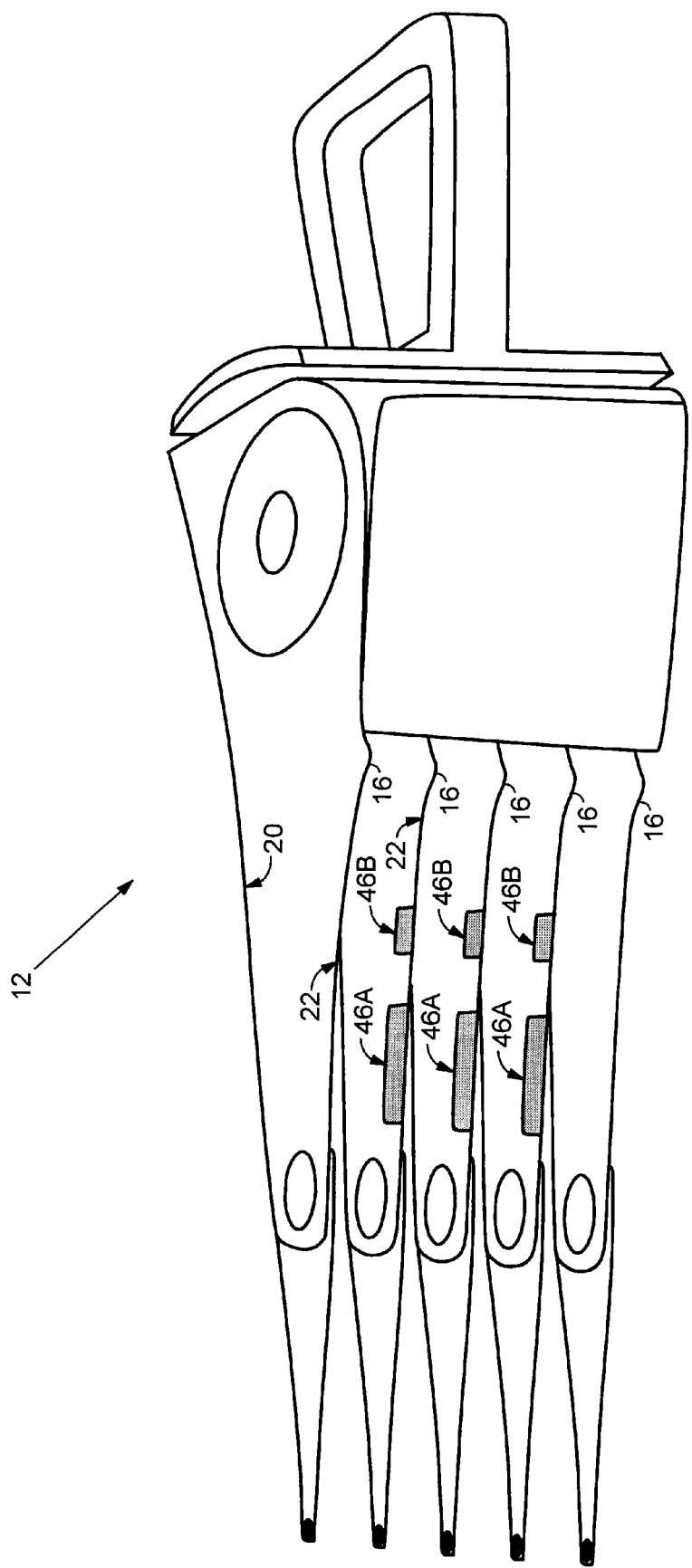
FIG. 7 shows an embodiment of the present invention wherein the thickness of the actuator arm has been modified in two separate areas.

In an alternative embodiment shown in FIG. 7, the thickness of the actuator arm 16 near the trailing edge 22 is modified (increased) in two different regions by adding two shims 46A and 46B. This embodiment reduces the area modified, thereby reducing the undesirable drag while still providing the desired shifting of the vortex shedding frequency away from the resonance frequencies of the head stack assembly 12. Further, modifying the thickness of the actuator arm 16 in two different regions tends to decrease the coherency of the vortex shedding, thereby attenuating its undesirable force as well as shifting its frequency away from the resonance frequencies of the head stack assembly 12.

Figure 8:
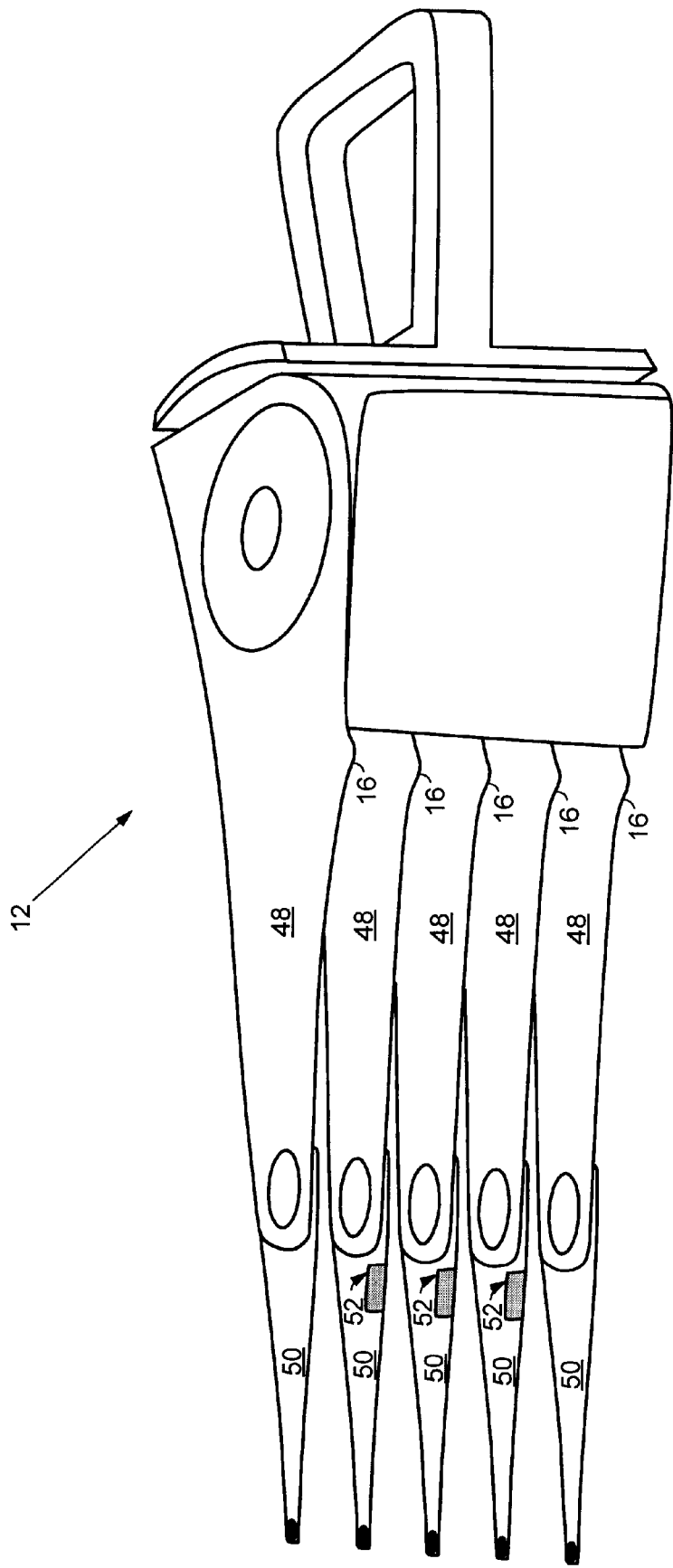
FIG. 8 shows an embodiment of the present invention wherein the thickness of a suspension which forms part of the actuator arm is modified.

In yet another embodiment shown in FIG. 8, the actuator arm 16 comprises a body 48 and a suspension 50 attached near the distal end of the body 48, wherein the head 17 is attached to the distal end of the suspension 50. The thickness of the actuator arm 16 is modified by adding a shim 52 to the suspension 50. The shim 52 added to the suspension 50 may be used in place of, or together with, a shim added to the body 48 of the actuator arm 16.

The actuator arm 16 may be manufactured by adding a shim (or shims) during the manufacturing process, wherein the thickness, number and location of the shims is determined using the above described iterative design process. Alternatively, the information gleaned from adding shims to the actuator arm during the iterative design process may be used to precisely machine the actuator arm 16 during manufacturing.

I claim:

1. A method of designing an actuator arm of a head stack assembly for use in a disk drive comprising a disk, the actuator arm for positioning a head over the disk while the disk is rotating at a selected spin-rate, the actuator arm having a leading edge and a trailing edge and a selected thickness, the head stack assembly having a structural resonance frequency, the method comprising the steps of:
    (a) rotating the disk such that the disk generates air flow around the actuator arm while the disk is spinning at the selected spin-rate;
    (b) controlling the actuator arm to position the head over the disk while the disk is spinning at the selected spin-rate, wherein the air flow travels from the leading edge to the trailing edge of the actuator arm such that the air flow causes vortex shedding at a vortex shedding frequency resulting in an undesirable force being applied to the actuator arm when the vortex shedding frequency is aligned with the structural resonance frequency;
    (c) measuring a perturbing effect due to the undesirable force applied to the actuator arm;
    (d) modifying the thickness of the actuator arm and storing thickness data;
    (e) repeating steps (b)–(d) at least once; and
    (f) selecting a manufacturing thickness for the actuator arm from the stored thickness data to compensate for the undesirable force that is applied to the actuator arm due to the vortex shedding.

2. The method of designing an actuator arm as recited in claim 1, wherein the disk further comprises a plurality of data tracks and a plurality of embedded servo sectors, each servo sector comprises a plurality of servo bursts recorded relative to a centerline of a particular data track, the step of measuring the perturbing effect comprises the step of:
    (a) using the head to generate a read signal while reading the servo bursts of an embedded servo sector; and
    (b) generating a head position error from the read signal, the head position error indicative of a position of the head with respect to a centerline of a respective track.

3. The method of designing an actuator arm as recited in claim 1, wherein a laser interferometer is employed in the step of measuring the perturbing effect due to the undesirable force applied to the actuator arm.

4. The method of designing an actuator arm as recited in claim 1, wherein the step of modifying the thickness of the actuator arm comprises the step of adding a shim to the actuator arm.

5. The method of designing an actuator arm as recited in claim 4, wherein the shim is added near the trailing edge of the actuator arm.

6. The method of designing an actuator arm as recited in claim 4, wherein the shim is added near the leading edge of the actuator arm.

7. The method of designing an actuator arm as recited in claim 4, wherein the step of modifying the thickness of the actuator arm comprises the step of adding a second shim to the actuator arm.

8. The method of designing an actuator arm as recited in claim 1, wherein:
    (a) the actuator arm comprises a body and a suspension; and
    (b) the step of modifying the thickness of the actuator arm comprises the step of adding a shim to the suspension.

9. The method of designing an actuator arm as recited in claim 1, further comprising the step of adjusting a radial location of the head in order to change a velocity of the air flow around the actuator arm.

10. A disk drive comprising:
    a disk; and
    a head stack assembly comprising an actuator arm for positioning a head over the disk while the disk is rotating at a selected spin-rate, the actuator arm having a leading edge and a trailing edge and a selected thickness, the head stack assembly having a structural resonance frequency,
    wherein the actuator arm is designed by:
        (a) rotating the disk such that the disk generates air flow around the actuator arm while the disk is spinning at the selected spin-rate;
        (b) controlling the actuator arm to position the head over the disk while the disk is spinning at the selected spin-rate, wherein the air flow travels from the leading edge to the trailing edge of the actuator arm such that the air flow causes vortex shedding at a vortex shedding frequency resulting in an undesirable force being applied to the actuator arm when the vortex shedding frequency is aligned with the structural resonance frequency;
        (c) measuring a perturbing effect due to the undesirable force applied to the actuator arm;
        (d) modifying the thickness of the actuator arm and storing thickness data;

(e) repeating steps (b)–(d) at least once; and
(f) selecting a manufacturing thickness for the actuator arm from the stored thickness data to compensate for the undesirable force that is applied to the actuator arm due to the vortex shedding.

11. The disk drive as recited in claim 10, wherein the disk further comprises a plurality of data tracks and a plurality of embedded servo sectors, each servo sector comprises a plurality of servo bursts recorded relative to a centerline of a particular data track, the step of measuring the perturbing effect comprises the step of:

(a) using the head to generate a read signal while reading the servo bursts of an embedded servo sector; and
(b) generating a head position error from the read signal, the head position error indicative of a position of the head with respect to a centerline of a respective track.

12. The disk drive as recited in claim 10, wherein a laser interferometer is employed in the step of measuring the perturbing effect due to the undesirable force applied to the actuator arm.

13. The disk drive as recited in claim 10, wherein the step of modifying the thickness of the actuator arm comprises the step of adding a shim to the actuator arm.

14. The disk drive as recited in claim 13, wherein the shim is added near the trailing edge of the actuator arm.

15. The disk drive as recited in claim 13, wherein the shim is added near the leading edge of the actuator arm.

16. The disk drive as recited in claim 13, wherein the step of modifying the thickness of the actuator arm comprises the step of adding a second shim to the actuator arm.

17. The disk drive as recited in claim 10, wherein:

(c) the actuator arm comprises a body and a suspension; and
(d) the step of modifying the thickness of the actuator arm comprises the step of adding a shim to the suspension.

18. The disk drive as recited in claim 10, the actuator arm is further designed by adjusting a radial location of the head in order to change a velocity of the air flow around the actuator arm.

\* \* \* \* \*

UNITED STATES PATENT AND TRADEMARK OFFICE
CERTIFICATE OF CORRECTION

PATENT NO. : 6,441,998 B1
DATED : August 27, 2002
INVENTOR(S) : Scott D. Abrahamson It is certified that error appears in the above-identified patent and that said Letters Patent is hereby corrected as shown below:

<u>Title page,</u>
The title of this patent should read as follows:

-- COMPENSATING FOR VORTEX SHEDDING IN A DISK DRIVE BY MODIFYING THE THICKNESS OF AN ACTUATOR ARM --

Signed and Sealed this

Nineteenth Day of November, 2002

*Attest:*

*Attesting Officer*

JAMES E. ROGAN
*Director of the United States Patent and Trademark Office*